United States Patent [19]
Morris, Jr. et al.

[11] Patent Number: 5,868,000
[45] Date of Patent: Feb. 9, 1999

[54] AUGER TYPE POULTRY CHILLER WITH CLUMPING PREVENTION

[75] Inventors: William F. Morris, Jr., Raleigh; Robert Chatham, Garner; James Poindexter, Dobson; Terry Wright, Morrisville, all of N.C.

[73] Assignee: Morris & Associates, Raleigh, N.C.

[21] Appl. No.: 925,491

[22] Filed: Sep. 8, 1997

[51] Int. Cl.$^6$ .................................................. F25D 17/02
[52] U.S. Cl. ............................... 62/374; 62/381; 62/63; 62/64
[58] Field of Search ................. 34/179, 181, 182; 62/63, 64, 373–376, 381

[56] References Cited

U.S. PATENT DOCUMENTS

| | | |
|---|---|---|
| 3,250,086 | 5/1966 | Morris, Jr. .................................. 62/375 |
| 3,410,101 | 11/1968 | Morris, Jr. .............................. 62/375 X |
| 4,719,766 | 1/1988 | Morris, Jr. . |
| 4,895,310 | 1/1990 | Morris, Jr. . |
| 4,982,574 | 1/1991 | Morris, Jr. . |
| 5,167,130 | 12/1992 | Morris, Jr. . |
| 5,327,817 | 7/1994 | Zittel ...................................... 62/381 X |
| 5,439,694 | 8/1995 | Morris, Jr. . |
| 5,456,091 | 10/1995 | Zittel ........................................ 62/375 |
| 5,509,470 | 4/1996 | Bass . |
| 5,531,034 | 7/1996 | Mentz ...................................... 34/179 |

*Primary Examiner*—Christopher B. Kliner
*Attorney, Agent, or Firm*—Thelen Reid & Priest LLP

[57] ABSTRACT

In an auger-type product chiller having an auger including a series of successive flights that form a generally helical structure that, when rotated, moves product through cold water for chilling the product, control elements extending from faces of the flights at a non-zero angle. The control structures prevent "clumping" and packing of poultry product, break up any "clumps" and packs of the product that may develop, and improve product uniformity. In this manner, the advantages of proper agitation, as well as rapid, predictable and even product cooling and moisture introduction, are achieved. Implementations of the control elements include sets of rods extending from the flights at 30° angles from radial lines of affixation to the flights, flat plates extending from the flights at 30° angles from radial lines of affixation to the flights, and sets of rods extending between successive flights near peripheries of the flights.

14 Claims, 3 Drawing Sheets

AUGER TYPE POULTRY CHILLER WITH CLUMPING PREVENTION

BACKGROUND OF THE INVENTION

1. Field of the Invention

The present invention relates to poultry chillers. More specifically, the invention relates to auger-type poultry chillers in which "clumping" or packing of poultry in the auger is minimized or prevented.

2. Related Art

Poultry chillers, such as auger-type poultry chillers, are known in the art. A partial cutaway view of a portion of one such auger-type poultry chiller is illustrated in FIG. 1 and a side cutaway view thereof is illustrated in FIG. 2.

An auger of the chiller includes a series of flights 100A, 100B, 100C, 100D, 100E, and so forth. Each flight includes a series of steps 101, 102, and so forth. The steps are inherent in the construction of the flights. The flights are connected in a series so that their outer edges form a continuous helical structure located within a housing 105. Suitable means, such as a motor, rotates the auger counterclockwise as viewed in FIG. 1 within the housing to move the product at a controlled rate from an inlet end to an outlet end.

Items of a poultry product, such as slaughtered, eviscerated chickens or turkeys, enter the housing through a first end 110 and are moved through a chilled water bath by rotation of the auger toward a second end 120. During the chilling process, chilled water enters the housing at entry points 130, and exits at point 140, the water flowing in a direction opposite to that of the poultry product. The water being warmed by contact with the initially-warmer poultry product, is re-circulated and re-chilled by a refrigeration unit 150 before being returned to the auger housing.

In this manner, the poultry product entering the housing is chilled by the water flowing in the opposite direction to its own motion. When operating properly, the chilled water flowing in the chiller lowers the temperature of the product uniformly and sufficiently from approximately 100° F. to approximately 35° F. before the product exits the chiller at end 120.

The chiller illustrated in FIG. 1 has the disadvantage that the poultry product sometimes packs and "clumps" in certain areas in the housing rather than progressing; uniformly through the chiller When the product packs and clumps in certain flights rather than being evenly distributed among the flights, the chilled water does not surround each item uniformly, retarding the chilling of the product to USDA (United States Department: of Agriculture) standards, impeding the desired agitation of the product, and thwarting uniform control of moisture introduced into the product as well as uniform final temperature. It is to prevent such clumping, and to maximize the functional advantages of an auger-type chiller, that the present invention is directed.

SUMMARY OF THE INVENTION

The present invention provides a set of structures to be added to a conventional auger-type (or similar type) poultry chiller that prevents "clumping" and packing of poultry product, or breaks up any "clumps" and packs of the product that may develop and improves product uniformity. In this manner, the advantages of proper agitation, as well as rapid, predictable and even product cooling and moisture introduction, are achieved.

Other objects, features and advantages of the invention will become apparent to those skilled in the art upon a reading of the following Detailed Description when read in conjunction with the accompanying drawing figures.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
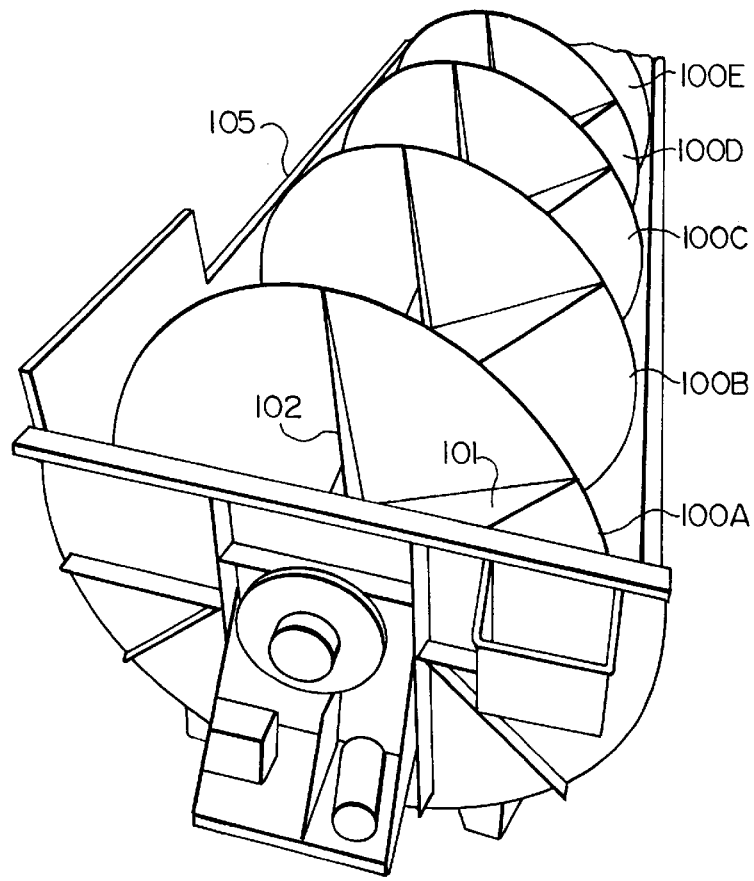
FIG. 1 is a partial-cutaway perspective view of a conventional auger-type chiller.
Figure 2:
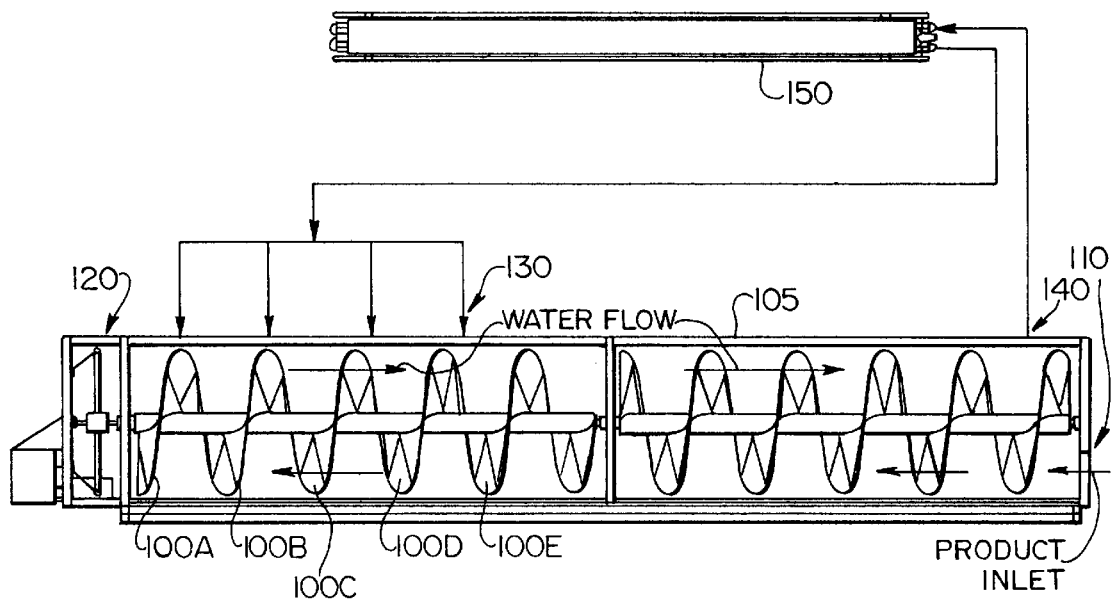
FIG. 2 is a schematic side elevation cutaway view of the chiller of FIG. 1.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 3:
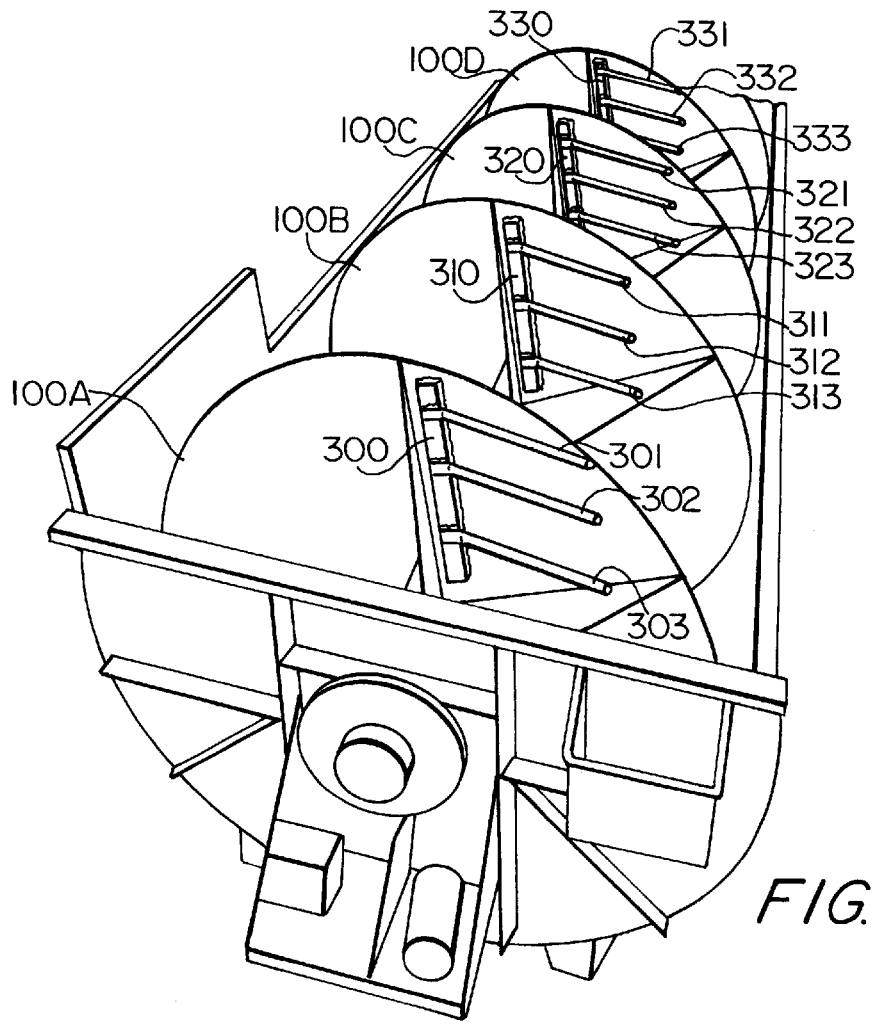
FIG. 3 is a partial-cutaway perspective view of an auger-type chiller employing features of a preferred embodiment of the present invention.

Referring to FIG. 3, various control elements are shown attached to forward faces of successive flights of the auger. In particular, a first element including bracket 300 and rods 301, 302, 303 are shown connected to flight 100A. Likewise, a second element including bracket 310 and rods 311, 312, 313 are shown connected to flight 100B. Similarly, control elements including pieces 320, 321, 323, 324 and 330, 331, 332, 333 are affixed to respective flights 100C and 100D.

The control elements rotate with the flights as the auger turns, effectively stirring the poultry product in the chilled water bath in which the auger sits and through which the poultry product is moved. In this manner, the control elements assure that the poultry product is more evenly distributed along the various fights of the auger rather than being concentrated between specific flights. The stirring and de-clumping action of the control elements ensure that the advantages of proper agitation, as well as rapid, predictable and even product cooling and moisture introduction, are achieved.

Figure 4A:
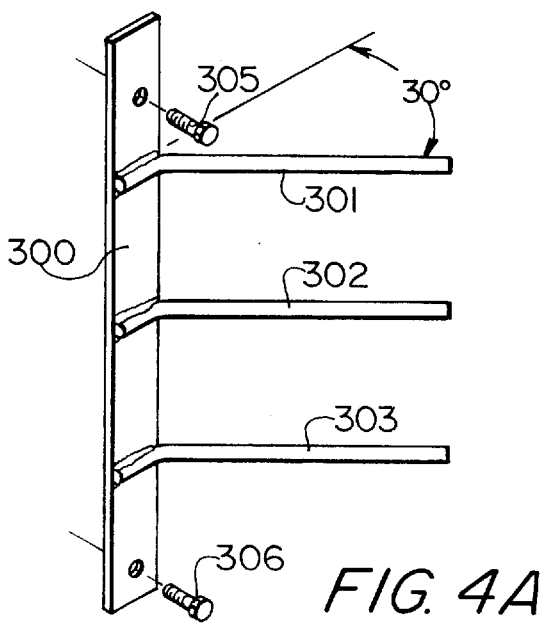
FIGS. 4A, 4B, 4C, and 4D illustrate various embodiments of control elements that may be affixed to flights of the auger so as to reduce clumping and packing of poultry product, in accordance with the teachings of the present invention.

FIG. 4A illustrates one of two preferred embodiments of the control element according to the present invention. Rods 301, 302, 303 are welded to, or integrally manufactured with, or otherwise affixed to, bracket 300. Bracket 300 is to its auger flight by means of screws 305, 306 or some other suitable means.

Preferably, there is a 30° angle between the face of the auger flight and the rods when the control element as a whole is installed. In a typical seven-foot or eight-foot-diameter auger chiller, bracket 300 is a flat stainless steel bar 2.5 inches wide, 0.25 inches thick, and 24 to 30 inches long. The rods 301, 302, 303 are preferably 10 to 18 inch-long, 0.25-inch-thick stainless steel members that are oriented perpendicular to the radius of the auger. After being installed, the angle of the rods can be adjusted however it is believed to be necessary to achieve proper anti-clumping action for a particular auger chiller unit and poultry product.

Figure 4B:
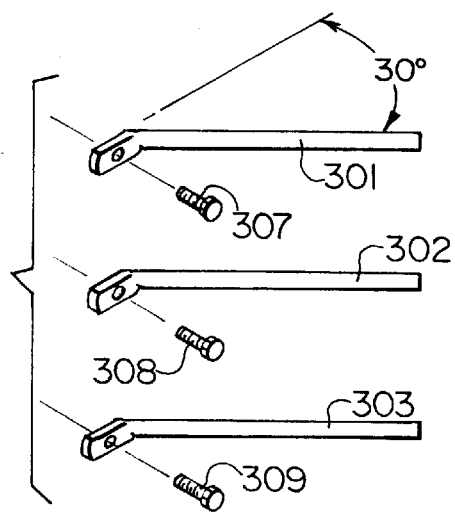

FIG. 4B illustrates a variation of the embodiment of FIG. 4A. FIG. 4B shows an arrangement in which rods 301, 302, 303 are directly affixed to the auger face by means of respective screws 307, 308, 309 rather than using an intermediate bracket 300. The efficacy of the embodiments of FIGS. 4A and 4B in anti-clumping poultry product are similar. This structure, orientation, and size of the first two embodiments have been found to optimally prevent clumping of poultry product. Moreover, the adjustability and cleanability of these embodiment is found to be preferable to other embodiments.

Figure 4C:
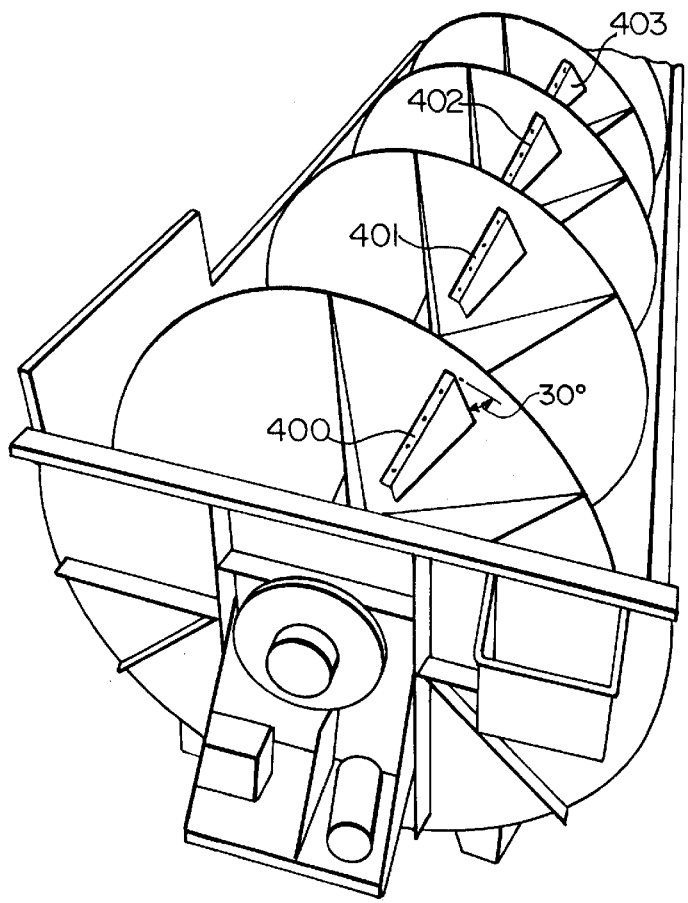

A third embodiment is shown in FIG. 4C. In this third embodiment, flat plates 400, 401, 402, 403 are affixed (such as by screws) to respective forward faces of the auger flights along generally radial lines of affixation, and are preferably bent at 30° angles to the faces of the flights.

Figure 4D:
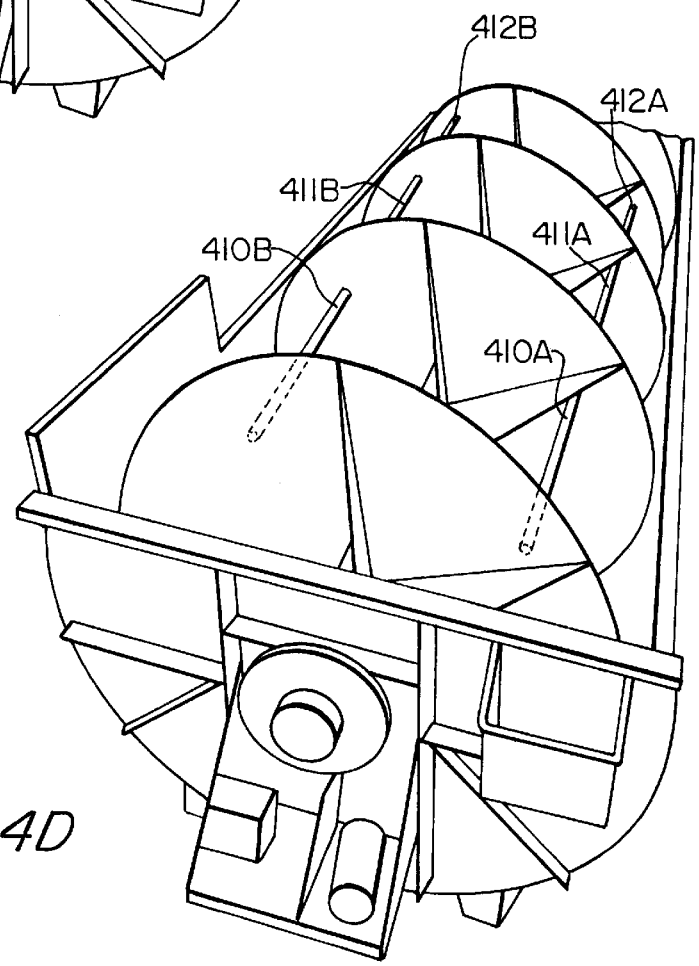

A fourth embodiment is shown in FIG. 4D. In this fourth embodiment, rods 410A, 410B, 411A, 411B, 412A, 412B are affixed (such as by screws) between successive auger flights, preferably near the outer periphery thereof, and are oriented parallel to the auger shaft.

The third and fourth embodiments have a clumping prevention effect that is achieved through geometries different from that of the first and second embodiments.

Modifications and variations of the above-described embodiments of the present invention are possible, as appreciated by those skilled in the art in light of the above teachings. For example, the number, dimensions and orientation of rods in a given control arrangement may readily be varied while still remaining within the scope of the invention. It is therefore to be understood that, within the scope of the appended claims and their equivalents, the invention may be practiced otherwise than as specifically described.

What is claimed is:

1. In an auger-type product chiller having an auger including a series of successive flights that form a generally helical structure that, when rotated, moves product through a cold fluid for chilling the product, the improvement comprising:

a plurality of rods extending from faces of the flights at a non-zero angle at respective plurality of radial positions distant from a periphery of the helical structure.

2. The chiller of claim 1, wherein:

the plurality of rods includes a set of more than one rod extending from each successive flight.

3. In an auger-type product chiller having an auger including a series of successive flights that form a generally helical structure that, when rotated, moves product through a cold fluid for chilling the product, the improvement comprising:

a plurality of rods extending from faces of the flights at a non-zero angle;

wherein the plurality of rods includes a set of more than one rod extending from each successive flight; and wherein each set of more than one rod includes three rods per flight.

4. The chiller of claim 1, wherein:

the non-zero angle is about 30°.

5. In an auger-type product chiller having an auger including a series of successive flights that form a generally helical structure that, when rotated moves product through a cold fluid for chilling the product, the improvement comprising:

a plurality of rods extending from faces of the flights at a non-zero angle; and a bracket affixed to a face of a flight along a generally radial line of affixation, and to which some of the plural rods are attached.

6. The chiller of claim 5, wherein:

the bracket is affixed to the face of the flight by screws.

7. In an auger-type product chiller having an auger including a series of successive flights that form a generally helical structure that, when rotated, moves product through a cold fluid for chilling the product, the improvement comprising:

a plurality of rods extending from faces of the flights at a non-zero angle; and a bracket, integrally formed with more than one of the plurality of rods, the bracket being affixed to a face of a flight along a generally radial line of affixation.

8. The chiller of claim 7, wherein:

the bracket is affixed to the face of the flight by screws.

9. The chiller of claim 1, wherein:

at least some of the plurality of rods are directly affixed to flights of the auger.

10. The chiller of claim 9, wherein:

the at least some of the plurality of rods that are directly affixed to the flights of the auger are affixed to the flights by screws.

11. In an auger-type product chiller having an auger including a series of successive flights that form a generally helical structure that, when rotated, moves product through a cold fluid for chilling the product, the improvement comprising:

a plurality of flat plates extending from faces of the flights at a non-zero angle.

12. The chiller of claim 10, wherein:

the non-zero angle is about 30°.

13. The chiller of claim 10, wherein:

the plurality of flat plates are affixed to the flights along generally radial lines of affixation.

14. The chiller of claim 13, wherein:

the plurality of flat plates are affixed to the flights by screws.

* * * * *